RECORDING OF COLOR IMAGES

Filed June 3, 1953 4 Sheets-Sheet 1

INVENTOR.
Richard C. Webb

BY [signature]
ATTORNEY

INVENTOR.
Richard C. Webb
BY [signature]
ATTORNEY

INVENTOR.
Richard C. Webb
BY [signature]
ATTORNEY

RECORDING OF COLOR IMAGES

Filed June 3, 1953 4 Sheets-Sheet 4

INVENTOR.
Richard C. Webb

BY [signature]
ATTORNEY

United States Patent Office 2,769,028

Patented Oct. 30, 1956

2,769,028

RECORDING OF COLOR IMAGES

Richard C. Webb, Denver, Colo., assignor to Radio Corporation of America, a corporation of Delaware Application June 3, 1953, Serial No. 359,297

14 Claims. (Cl. 178—5.4)

The present invention relates to new and improved apparatus for the recording of color television images and the like on monochrome motion picture film stock and the reproduction of signals from such record.

More particularly, as will appear, this invention is an improvement on the invention described in the co-pending application of R. D. Kell, S. N. 219,926, filed November 12, 1952, for "Recording of Color Images."

In view of the costliness of recording multi-color images on color film and by reason of the registration difficulties inherent in systems employing color separations, the need for a practicable system of recording color television has been quite acute. Hence, it is a principal object of the present invention to provide an improved system for recording color television images on black and white film stock.

There have been certain proposals intended to accomplish the above aim. According to the system shown and described in the Kell application referred to above, video signals representative of brightness are applied to a kinescope in the usual manner. Two carriers of frequencies higher than the highest frequency of the brightness signal are individually amplitude modulated with different sets of color information (e. g., "color difference" signals) and these carriers, together with their side bands, are applied to the kinescope simultaneously with the brightness signal. A motion picture film camera photographs the kinescope images in a frame-by-frame manner to produce a permanent record of the three sets of information. Thus, the signals may be recovered by scanning the film in conjunction with a photocell so that the carriers may be selected by suitable filters and amplitude-detected, the brightness signal being separated from the composite output of the photocell by means of a low pass filter.

Applicant has found that by recording the carriers of the Kell system in areas of the film other than the "image areas" or frames, all "beats" which might otherwise result from the carriers are successfully avoided. Thus, it is another object of the present invention to provide means for recording color television signals on black and white film stock which is completely free of "beats" between the various signals so recorded.

Another object hereof is the provision of means, as set forth, in which the carriers employed for distinguishing the several recorded signals are maintained separate from the color information on the recording medium.

In accordance with a specific embodiment of this invention, the carriers in a system of the above-described type are recorded in those regions of the film which lie between the image areas or frames. More specifically, where two such carriers of different frequencies are involved in a recording arrangement, it is contemplated that one carrier be recorded in one inter-frame region and the other carrier in the next inter-frame region. Thus, the image area of the film will contain density variations corresponding, for example, to one color (viz., green) or brightness information and side band information as to two additional colors (or "color differences"). For "playback," the invention provides unique optical means for scanning the image frame and associated carrier regions simultaneously, so that a photocell device may re-develop the carriers and their side bands simultaneously.

Hence, a further object hereof is to provide means, as set forth, wherein a carrier employed in producing distinguishable side bands is recorded in a region of a film strip which is adjacent but not co-extensive with its image areas.

A still further and more specific object is to provide such means wherein carriers, as above described, are recorded in the regions of a film strip between the image areas or frames thereof.

As has been pointed out, a salient advantage of the invention is its complete elimination of beats and other interference between the carriers. Additional objects and advantages of the invention will become apparent to those skilled in the art from a study of the following detailed description of the accompanying drawings, in which.

Figure 1:
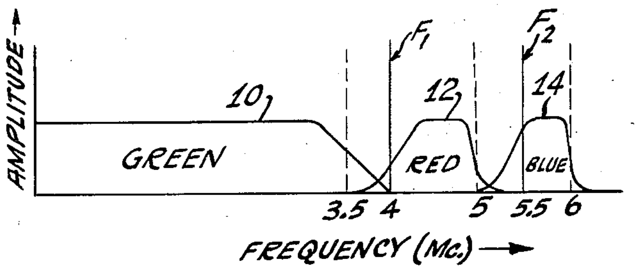
Fig. 1 is a frequency spectrum chart illustrative of a basic principle of the invention.

As has been stated in a general manner, the present invention relates to film recording wherein several color components of an image which may be either in the form of red, green and blue signals, for example, or luminance (brightness) hue and chroma (or color difference signals) are recorded simultaneously on the same general area of monochrome motion picture film by the use of carrier multiplexing techniques. In order to simplify the description of the invention, it will be assumed hereinafter that the color components to be recorded are red, green and blue signals, although, as will be appreciated, the invention is equally applicable to the recording of the other sets of information alluded to earlier. Referring to the drawing, Fig. 1 illustrates the distribution of color signal components in accordance with frequency wherein, for example, the green channel is shown as occupying a frequency band 10 from 0 to 3.5 megacycles, thus bearing the major portion of picture detail in accordance with well known principles. A group of side bands of a carrier whose frequency is $F_1$ (4 megacycles) relating to red information is further shown at 12 with the carrier $F_1$ substantially completely suppressed and with the lower side bands substantially attenuated. Similarly, signal side bands 14 grouped around carrier $F_2$ (5.5 megacycles) relating to blue information are illustrated with the carrier suppressed and the lower side bands attenuated. Since no regular pattern of carriers is present here, it will be seen that there is no possibility of producing beat patterns.

Figure 2:
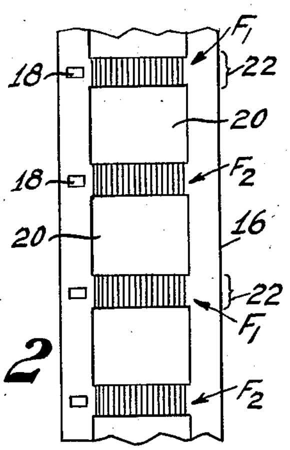
Fig. 2 illustrates a portion of a motion picture film strip on which are recorded the "carriers" referred to supra.

Fig. 2 illustrates generally a strip of motion picture film 16 having the usual sprocket holes 18 or other driving means and shows the general arrangement found in conventional photographic procedures wherein the images are recorded in generally rectangular image areas or frames 20. This figure further illustrates the location of the inter-frame regions 22 which ordinarily separate the frames and it is in these inter-frame regions that the carriers $F_1$ and $F_2$ of Fig. 1 are recorded, in accordance with the present invention, as indicated diagrammatically by the grating-like density variations bearing the designations $F_1$ and $F_2$.

Figure 3:
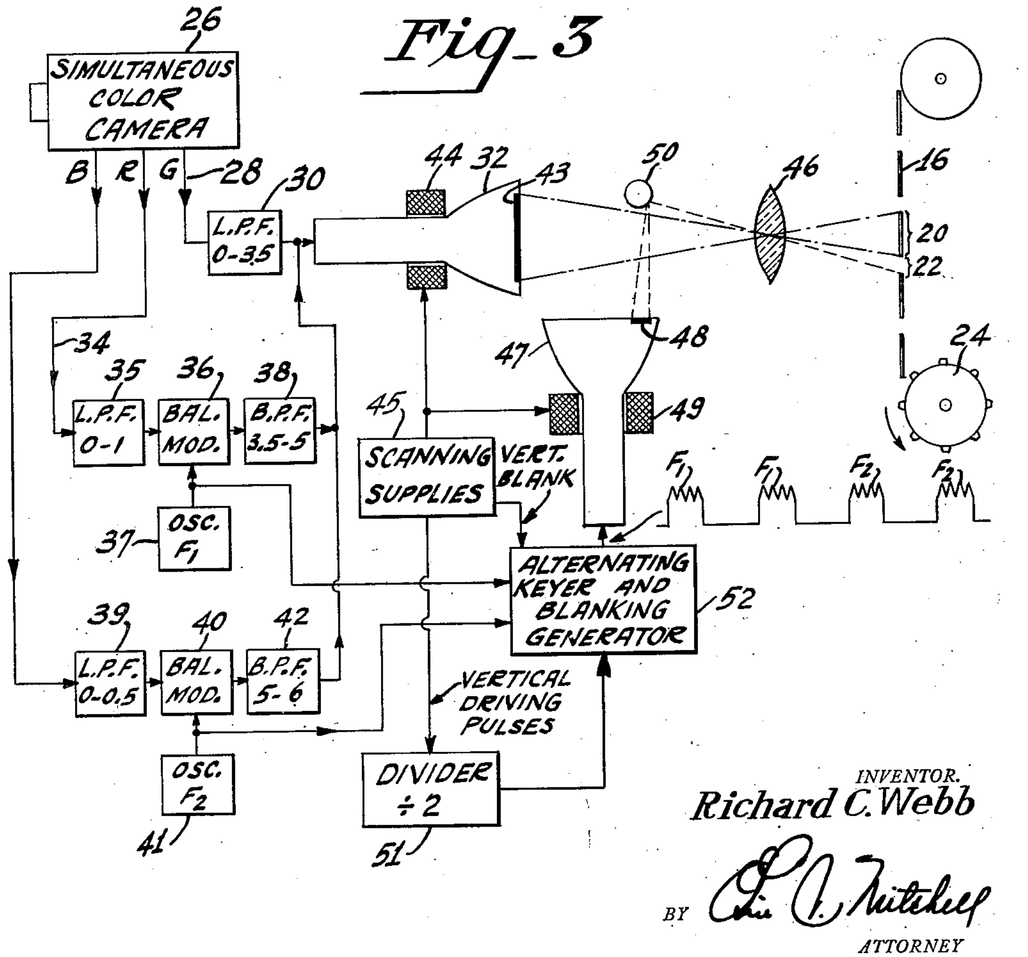
Fig. 3 is a simplified block diagram of basic apparatus for recording color television images in accordance with the invention.

Fig. 3 illustrates, in a simplified manner, apparatus for recording color television images on black and white film 16 driven by sprocket wheel 24 which may be energized in any convenient and conventional manner. Movement of the film 16 may be continuous, as in conjunction with an alternate optical path arrangement such as that described and claimed in U. S. Patent No. 2,590,281, Sziklai et al., granted March 25, 1952. On the other hand, the film movement may be intermittent and at any convenient rate of travel. Since the film travel rate and the apparatus for producing the same do not constitute a part of the present invention, it will be assumed, in the interest of simplicity, that the film travels intermittently and at a rate of 30 film frames per second, this number being equal to the television frame rate of present day practice. A simultaneous color camera 26, which may be of any known variety, furnishes at its output terminals signals representative of green, red and blue information regarding an image being televised. The green signal is coupled via lead 28 to a low pass filter 30 which cuts off at 3.5 megacycles, in accordance with the frequency distribution of Fig. 1. The output of filter 30 is applied to the beam intensity modulating electrode (not shown) of a kinescope 32. The red signal from camera 26 is fed via lead 34 to a low pass filter 35 (0–1 megacycle) to limit the band of frequency relating to red information and the output of filter 35 is, in turn, applied to a balanced modulator 36. Also applied to modulator 36 is a carrier wave from oscillator 37 of frequency $F_1$ and the output of the modulator constitutes the upper and lower side bands of the amplitude modulated carrier wave $F_1$, the carrier being suppressed by the modulator. Since the specific circuits of the oscillators and modulators of Fig. 3 are not a part of the present invention, it will be understood that they may take any known form, with the requirement of stability of oscillation and the additional requirement that the modulators be balanced against the carriers to suppress them. The output of modulator 36 is then fed through band pass filter 38 which, by virtue of its selectively, passes only the upper side bands of the carrier $F_1$ and applies them to the control electrode of kinescope 32. Similarly, the blue color signal from camera 26 is limited to 0.5 megacycle by low pass filter 39 and is applied to balanced modulator 40 together with the output of oscillator 41 ($F_2$) so that the modulator 40, which is balanced against the carrier $F_2$, amplitude modulates that carrier and provides at its output the upper and lower side bands produced by such modulation. Band pass filter 42 selects the upper side bands of carrier $F_2$ and applies them to the control electrode of kinescope 32 together with the green and red information. An electron beam (not shown) within kinescope 32 is thereby modulated by the green signal and the upper side bands of amplitude modulated carriers $F_1$ and $F_2$ and is caused to scan a raster 43 on the face of the kinescope by such means as electromagnetic deflection coils 44 which derive horizontal and vertical deflection signals from a source 45. Light emanating from the face of the kinescope 32 is imaged via lens 46 onto the film 16 in the area 20 to produce density variations in the film frame corresponding to the green signal and the upper side bands of carriers $F_1$ and $F_2$ in a manner which will be understood by persons skilled in the art.

Figures 6, 7:
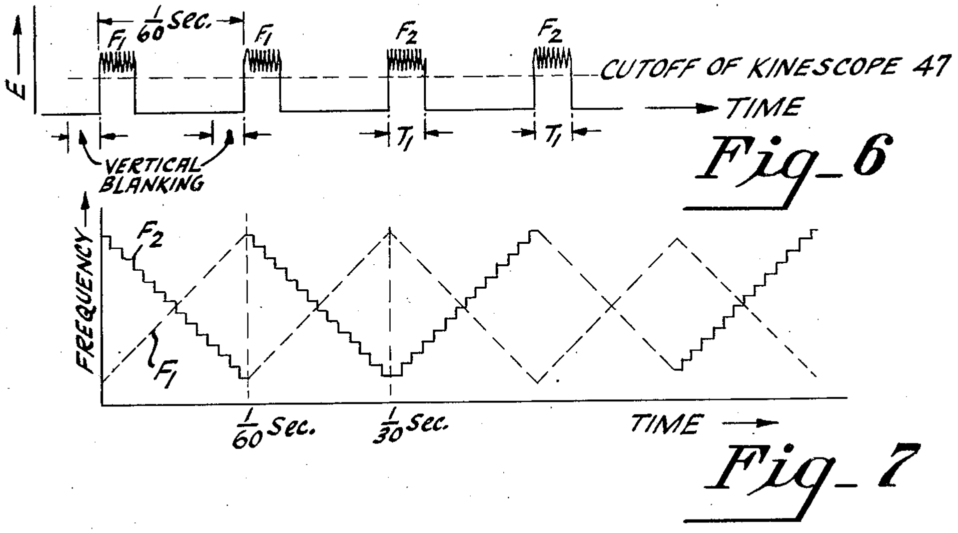
Fig. 6 is a voltage waveform to be discussed.
Fig. 7 is a frequency versus time plot to which reference will be made infra.
Figure 9:
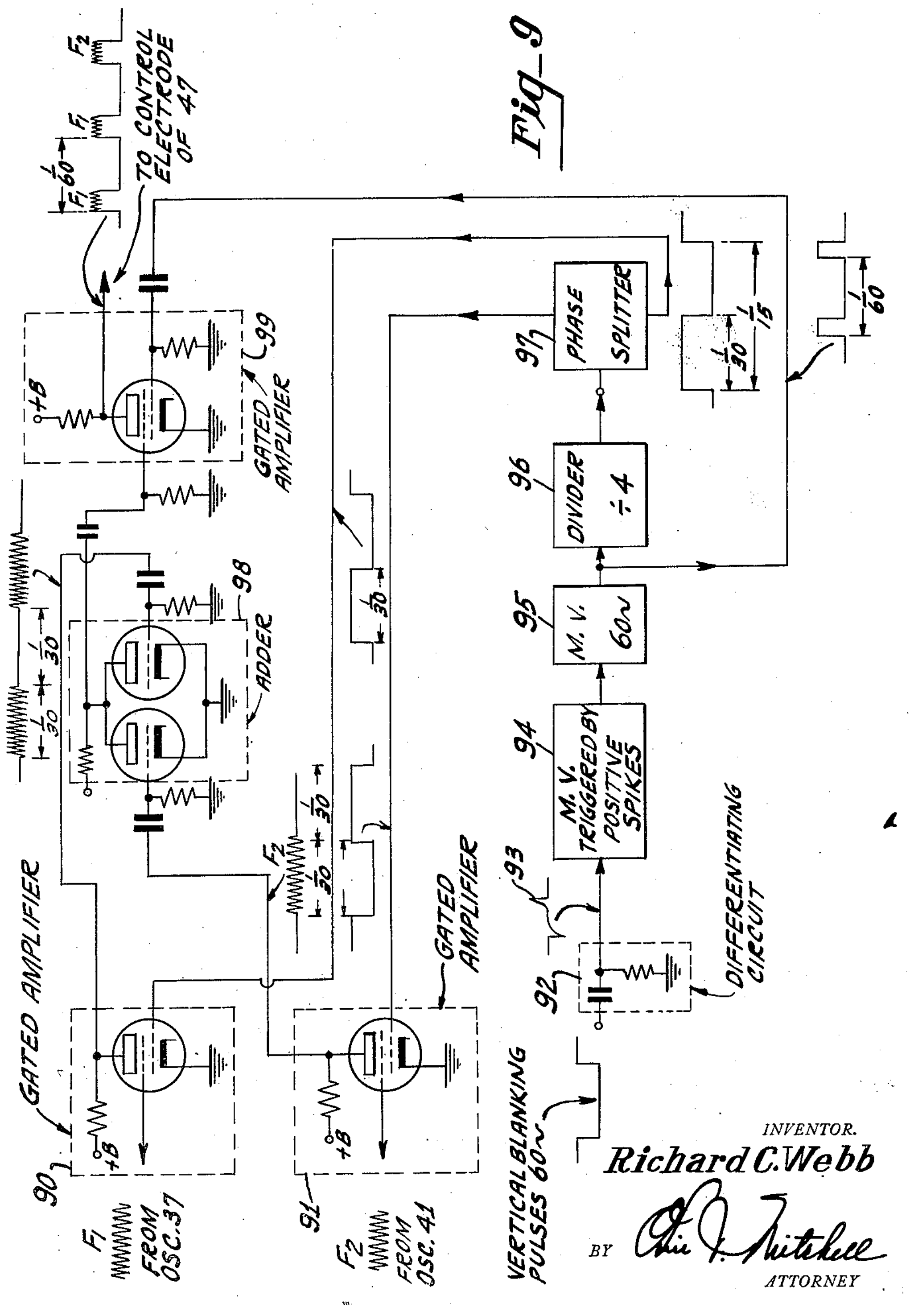

Also provided in the apparatus of Fig. 3 is a second kinescope 47 having means (not shown) for producing an electron beam which is caused to scan a "short" raster 48 as by means of deflection coils 49 which are energized by signals from source 45. The raster of kinescope 47 is reflected by the polished surface of rod 50 to lens 46 which images its light onto the interframe region or strip 22. The carriers $F_1$ and $F_2$ are recorded on alternate strips 22 in the following fashion: Vertical driving pulses from a source such as the scanning supply 45 occurring at the rate of 60 per second are applied to the circuit indicated by block 51 which may, for example, comprise a multivibrator adapted to furnish one output pulse for each two input pulses in order to divide the input frequency by a factor of two. Thus, the output of the divider 51 constitutes a 30 cycle per second square wave which is applied to the alternating keyer and blanking generator 52. Simultaneously with the pulses from divider 51, there are applied to circuit 52 waves of frequency $F_1$ and $F_2$, respectively, from oscillators 37 and 41, together with vertical blanking pulses from the scanning circuits 45. The specific circuitry indicated by block 52 is not a part of the present invention and, therefore, may take any form suitable for producing an output wave such as that illustrated in Fig. 6. Specifically, this wave includes "bursts" of frequency $F_1$ and $F_2$ appearing in the order shown, the bursts occurring at a repetition rate of 60 per second. Also shown in Fig. 6 are the locations of the vertical blanking pulses furnished by the scanning circuit 45. The reason for the specific order of frequencies of the bursts of Fig. 6, namely, $F_1$, $F_1$, $F_2$, $F_2$, etc. is that the film has, as stated, a rate of 30 frames per second, so that each two successive fields from kinescope 32 are recorded on the same film frame in the manner usual in television techniques. Thus since each two successive television fields appear on the same film frame, the frequency bursts must repeat in the sequence indicated in order that successive inter-frame strips of the film will bear gratings of frequency $F_1$ and $F_2$. It will, therefore, be understood that the "alternating keyer and blanking generator" 52 of Fig. 3 may comprise, by way of illustration, the circuit of Fig. 9, which shows a pair of gated amplifiers 90 and 91 for carriers $F_1$ and $F_2$, respectively, which amplifiers receive gating signals in the following manner: Since, as shown in Fig. 6, it is desired that the "bursts" occur after the vertical blanking of kinescope 47, the vertical blanking pulses from scanning generator 45 are differentiated at 92 to produce the alternate negative and positive spikes, shown at 93, which are applied to a multivibrator 94 which is adapted to be triggered by the positive-going spikes. This, in effect, delays the vertical blanking pulses by an amount equal to their duration, as will be understood from conventional practice. The output of multivibrator 94 comprises a 60 cycle square wave which may, if desired, be delayed slightly by means of a second multivibrator 95 triggered by the trailing edges of the pulses produced by the preceding multivibrator. The output of multivibrator 95 is applied to a divider 96 which divides the frequency by a factor of four, thereby producing a 15 cycle square wave which is coupled to a phase splitter 97 to furnish opposite phases of a square wave to the gated amplifiers 90 and 91, as indicated by the waveforms on the drawing. Hence, the outputs of the gated amplifiers include 1/30 second bursts of frequency $F_1$ and $F_2$ which are added in circuit 98 and applied to an additional gated amplifier 99 which receives 60 cycle positive pulses from the output of multivibrator 95 so that its output constitutes the waveform of Fig. 6 which is coupled to the intensity modulating electrode of kinescope 47. Circuits suitable for use in the multivibrator blocks are described in detail in the textbook "Waveforms," volume 19 of the MIT Radiation Laboratory Series, published 1949 by the McGraw-Hill Book Company, Inc. The duration $T_1$ of each of the "bursts" should be chosen so that a sufficient number of lines from the kinescope 47 is produced to fall in the inter-frame strips of the film.

In view of the foregoing, it should now be apparent that, in operation, the kinescope 32 of Fig. 3 produces a raster of light modulated by green signals and the upper side bands of carriers $F_1$ and $F_2$ (modulated, respectively, by red and blue information). This light is imaged onto the film in area 20 to produce corresponding density variations. Simultaneously, the raster from kinescope 47 falls on alternate inter-frame strips 22 on the film with "gratings" corresponding to frequency waves $F_1$ and $F_2$. Thus, the film bears the necessary information for high definition color images which may be reproduced by the apparatus of Fig. 4.

Figures 4, 5:
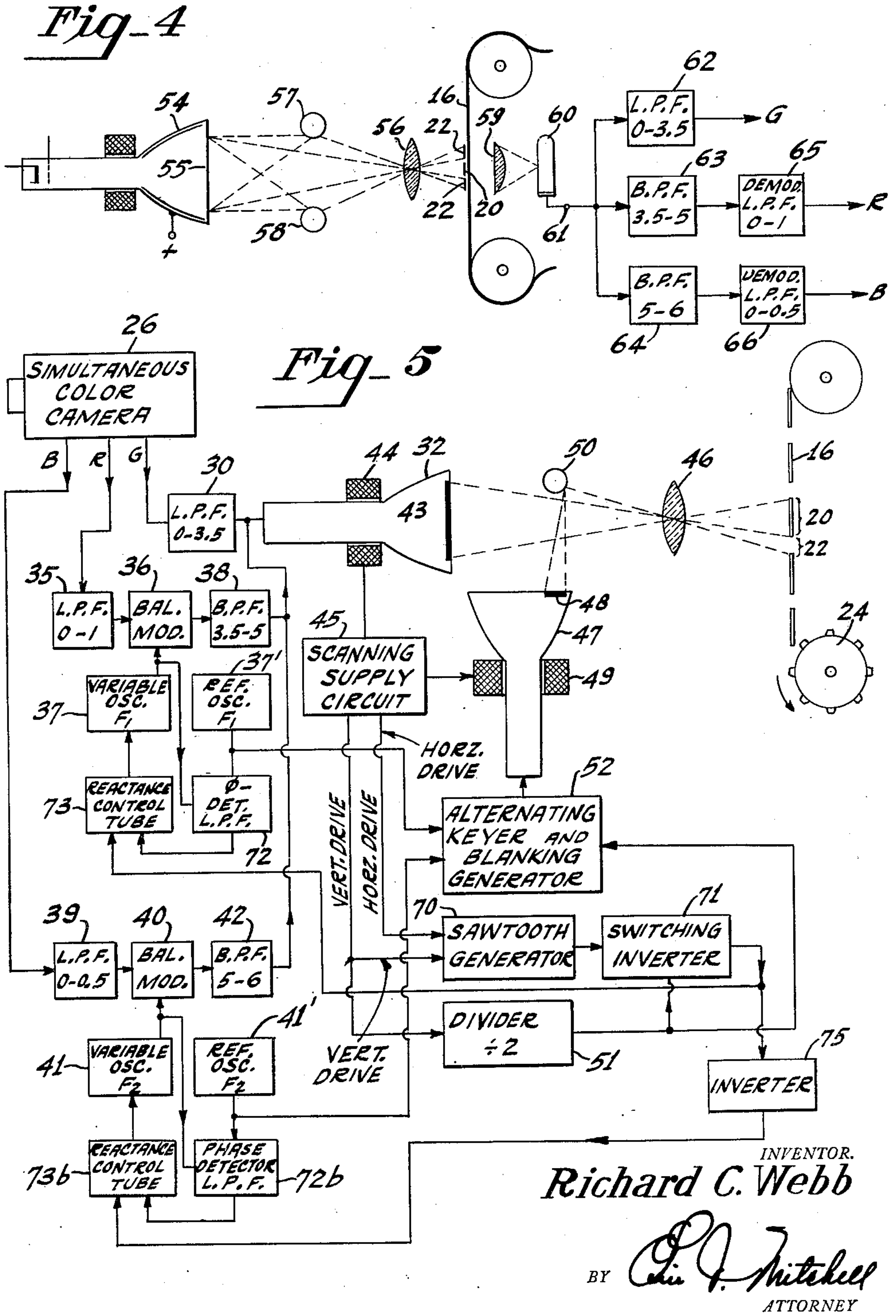
Fig. 4 is a block diagram of apparatus for reproducing color television signals from a film record such as that produced by the arrangement of Fig. 3.
Fig. 5 illustrates, by way of block diagram, a complete embodiment of the invention for recording color images.

In Fig. 4, a flying light spot source or kinescope 54 produces a blank raster 55 which is imaged by means of an optical system indicated by lens 56 onto the image frame area 20 of film 16 which is driven by suitable means at an intermittent 30 frame per second rate. Polished reflecting rods 57 and 58 simultaneously and in cooperation with lens 56 image foreshortened rasters on the inter-frame strips 22 of the film 16, which strips bear the carrier frequencies $F_1$ and $F_2$, respectively. Light modulated by the density variations of the film 16 is collected by lens 59 and focused onto the light-sensitive device or photocell 60, at whose output terminal 61 there are available the following signals: The video components or green information recorded in area 20, the upper side bands of the amplitude modulated carriers $F_1$ and $F_2$ (red and blue) all of which are reproduced by the direct image of the scanning raster 55, and waves of frequencies $F_1$ and $F_2$ produced by the foreshortened rasters scanning the inter-frame strips 22 of the film. Photomultiplier tubes, such as that indicated at 60, may be had with extremely linear amplitude response, so that it will be understood that a mixture of the various frequencies within the photocell will not lead to inter-modulation. Moreover, inter-modulation components between the side bands and the main image, which may occur by virtue of any non-linearity of the film structure, are related to the main image itself so that they are far less objectionable than the effect which would have been produced by beats between unrelated signals such as the carriers.

The green video signal is selected from the photocell output by means of low pass filter 62 which cuts off at 3.5 megacycles. Band pass filters 63 and 64 select the carriers $F_1$ and $F_2$ and their upper sidebands so that demodulators 55 and 56, which may comprise simple amplitude detectors, can detect the side band information and make available at their respective output terminals the red and blue video signals. Since the carriers $F_1$ and $F_2$ were recorded in regions of the film separate from the image areas 20, it will be recognized that there is no possibility of beats being produced between the unrelated carriers. In accordance with the invention, the carriers are maintained in usable form so that they may be reinserted optically into the photocell 60 by means of the foreshortened rasters reflected from polished rods 57 and 58 and imaged via lens 56 onto the carrier gratings in areas 22. Moreover, by virtue of the fact that the carriers are recorded in regions of the film different from the image areas, the carrier signals may be recorded with full contrast in order to assure that they will be substantially noise-free when they are reproduced by the apparatus of Fig. 4.

As thus far described, the invention has been illustrated in its basic form so that its principles may be more readily understood. It will be noted, however, that the preparation of the film during the recording of color signals must be performed with the fact in mind that the optical path lengths of the raster images reflected by the polished rods 57 and 58 of Fig. 4 vary as the scanning spot progresses from top to bottom of the raster. That is to say, when scanning lines are closer to one of the rods, the path length is shorter and the apparent width of the raster is maximum. Conversely, when the scanning line is at the opposite end of the raster, the path length is slightly greater, with the result that the apparent raster width is proportionately less. Since this path length variation for each of the polished rods occurs at a television field rate (i. e., 60 cycles per second), it leads to a field-rate, saw-tooth frequency modulation of each carrier signal which is derived when the variable length scanning lines are imaged upon the carrier grating recording. Geometric considerations have indicated that when the rods are located approximately half the distance between the face of the kinescope and the lens, the difference in path length can be brought to about one percent, so that there is obtained a frequency modulation of one percent of the desired carrier frequency. For a four megacycle carrier, this would, therefore, comprise a 40 kilocycle shift as the scanning progresses from top to bottom of the raster, which shift of the carrier with respect to its side bands may be more than can be tolerated, particularly in view of the vestigial side band arrangement involved. As may be noted, however, the frequency shift from these causes follows a definite pattern for a specified geometric arrangement, so that the undesirable shift may be compensated for in a manner to be described. In general, the carrier frequencies applied to the balanced amplitude modulators during the recording process are adjusted slightly, line by line, as the scanning progresses from top to bottom, so that the side band components on any point on the recording are grouped around the same carrier value that is reproduced when the playback equipment of Fig. 4 scans this part of the film. Both sets of the side bands printed on the film must thus be "frequency modulated" in this manner to follow the natural shift of the carrier signals as they are reproduced. A complete arrangement for effecting the compensation of the above-described carrier shift in recording apparatus based on the principles of the present invention, as illustrated diagrammatically in Fig. 3, is shown by way of block diagram in Fig. 5. In the latter figure, reference numerals identical to those employed in Fig. 3 indicate corresponding parts. Specifically, film 16 is drawn at an intermittent 30 frame-per-second rate by means of sprocket 24, just as in the case of Fig. 3, and is adapted to be scanned by a kinescope 43 whose beam (not shown) is modulated in the following fashion: A simultaneous color camera 26 produces green, red and blue signals which are applied, respectively, to the input terminals of low pass filters 30, 35 and 39 which limit the band of these several signals to 3.5 megacycles, 1 megacycle and 0.5 megacycle, respectively. The output of filter 30 is applied to the electron beam intensity-modulating electrode (not shown) of kinescope 32. The red signal, limited in frequency band by filter 35, is applied to a balanced amplitude modulator 36 which is also supplied with a carrier wave whose nominal frequency is $F_1$, the source of this wave being indicated by oscillator 37, so that the modulator 36, balanced against the carrier, furnishes to band pass filter 38 the upper and lower side band components grouped around frequency $F_1$. As has been stated, however, it is necessary that the frequency applied to the modulator 36 (as well as that applied to the blue modulator 40) be shifted, line by line, to compensate for the varying scanning line width resulting from varying optical path lengths.

Figure 8:
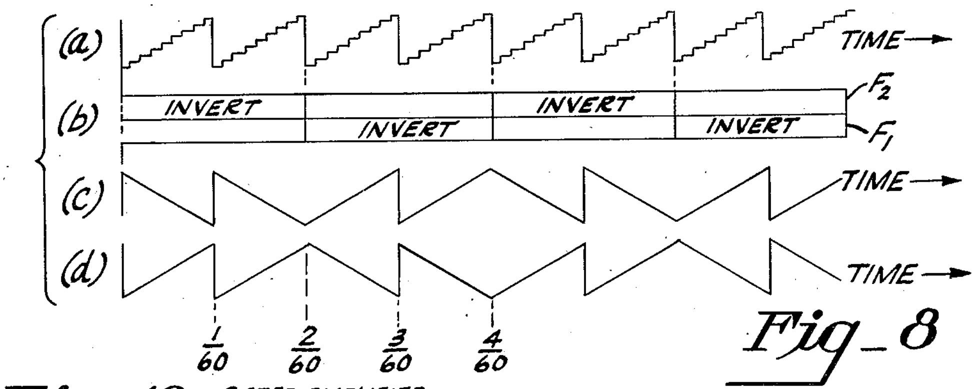
Fig. 8 illustrates several waveforms developed in the apparatus of Fig. 5.
Figure 10:
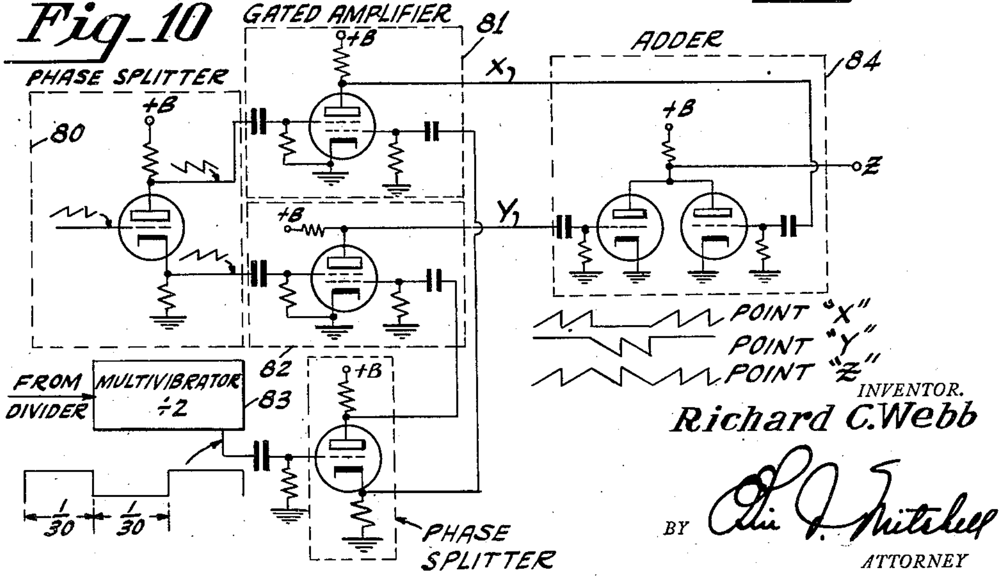
Figs. 9 and 10 are schematic diagrams of certain circuitry to be described in connection with the blocks of Figs. 3 and 5.

Fig. 7 illustrates the manner in which carriers $F_1$ and $F_2$ must be shifted to produce the desired result. Basically, as may be seen, the frequency-stepping comprises a saw-tooth wave modified at the horizontal or line rate into a series of steps having horizontal tops (since the polished rods 57 and 58 of Fig. 4 are parallel to the scanning lines of the raster 55 and there is, therefore, no shift of the reproduced carrier frequencies during a single line). It is, moreover, necessary to invert the basic vertical saw-tooth waveform at a frame rate (1/30 second) in order to obtain the required frequency shift signals as indicated, by reason of the fact that the location of the carrier grating strips alternates in each film frame. That is to say, while carrier $F_2$ may be recorded above the erect image in a given film frame, it is below it in the next succeeding frame, as may be seen from the showing of Fig. 2. Thus, in the first instance, the $F_2$ grating is scanned by the image of the raster reflected by rod 57 to produce a falling value of the reproduced $F_2$ frequency as scanning proceeds from the top to the bottom of the raster in both fields of that frame. In the second instance, however, $F_2$ is scanned by reflection from rod 58 which is at its maximum distance from the scanning lines at the top of the raster and, therefore, a steadily rising value of $F_2$ is obtained during each scan in the second frame. Thus, the side band signals associated with $F_2$, as recorded on the film, must follow a declining value of $F_2$ in the first two fields and then reverse and follow a rising value in the next two fields. Since the situation with respect to carrier $F_1$ is the exact reverse of that of $F_2$, it is not necessary to describe the $F_1$ shift in detail. The manner in which the frequency shifts, indicated by Fig. 7, is accomplished may be understood from a study of the waveforms of Fig. 8. Waveform *a* illustrates a vertical or field-rate, saw-tooth voltage modulated by horizontal or line components and may be produced by means of generator 70 of Fig. 5 to which are applied vertical and horizontal driving pulses from the scanning circuits 45 to synchronize the operation of the generator. The vertical driving pulses from circuit 45 are also applied to a divider circuit 51 whose output constitutes a square wave having a frequency of 30 cycles per second. The saw-tooth voltage *a* of Fig. 8 is then applied to a switching inverter 71 together with the 30 cycle square wave from divider 51. The switching inverter per se does not constitute a part of the present invention and may, therefore, take any conventional form of apparatus suitable for producing the waveform indicated at *c* in Fig. 8 which, as may be seen, follows the sequence shown by chart *b*. In waveforms *c* and *d* of Fig. 8, the horizontal or line components are not shown, but it should be understood that they are present, just as in the case of waveform *a*. Block 71 may comprise circuitry such as that of Fig. 10 which includes, for example, means such as a phase splitter 80 for producing opposite phases of the saw-tooth of Fig. 8 (*a*), a gated amplifier 81, 82 for each of such phases and means such as a multivibrator 83 for furnishing opposite phases of a 15 cycle square wave to each of the gated amplifiers, the outputs of two gated amplifiers being connected to an adder 84 comprising two amplifiers having a common load impedance. Other forms of apparatus suitable for producing waveform *c* of Fig. 8 form the saw-tooth *d* in accordance with the band *b* will also suggest themselves to those skilled in the art and may be employed without departing from the spirit of the invention.

Returning to the "red channel" of the apparatus of Fig. 5, it will be seen that the arrangement includes a reference oscillator 37' having a stable, basic frequency of $F_1$. The output of oscillator 37' is compared in phase with that of the variable oscillator 37 in a phase detector 72 which may be of any known type. The phase detector furnishes a D.-C. control voltage indicative of any phase differences between the two oscillators 37 and 37', which voltage is employed to control a reactance tube frequency stabilizing device 73 associated with the variable oscillator 37. Also applied to the reactance control tube circuit 73 is a voltage of the form shown at *c* in Fig. 8, so that the frequency of oscillator 37 is varied, line by line, and at a field rate in accordance with the saw-tooth applied from circuit 71. Thus, the balanced modulator 36 is supplied with a wave of frequency, nominally $F_1$, which varies in the manner shown in Fig. 7, so that the output of modulator 36 comprises side bands of the carrier (which is itself suppressed) which are grouped about gradually (i. e., line by line) varying center frequencies. After passing through filter 38 which selects those side bands between 3.5 and 5 megacycles, the upper side bands are applied to the kinescope 43.

The "blue channel" including low pass filter 39 and balanced modulator 40 is substantially the same in arrangement as the red channel, with the exception that its reactance control tube 73 is furnished in addition to the D.-C. voltage from phase detector 72 (*b*), with a voltage of waveform *d* of Fig. 8. This voltage is, as may be seen from a comparison of waveforms *c* and *d*, of exactly the opposite phase from that of waveform *c* and is produced by an inverter circuit 75 which may, for example, constitute a simple polarity reverser known in the art. Thus, reference oscillator 47 furnishes a wave of stable frequency $F_2$ to phase detector 72 (*b*) which also receives the output of variable $F_2$ oscillator 41 to produce a control voltage indicative of any phase difference between the two and applies this voltage to reactance circuit 73 (*b*). The latter circuit causes the frequency of oscillations of variable oscillator 41 to change in a line by line manner, as shown in Fig. 7. The output of oscillator 41 is coupled to balanced modulator 40 whose output is, in turn, applied to band pass filter 42 for the purpose of selecting the upper side bands which are applied to the kinescope 43 along with the green and blue signals, set forth supra. The reference oscillators 37' ($F_1$) and 41' ($F_2$) also furnish waves of stable frequencies $F_1$ and $F_2$, respectively, to the alternating keyer and blanking generator 52 which applies a voltage such as that illustrated in Fig. 6 to the electron beam intensity modulating electrode (not shown) of kinescope 47.

Thus, in operation, an electron beam (not shown) in kinescope 32 is caused by means of deflection coils 44 energized from supply 45 to scan a raster 43, which is imaged via lens 46 onto area 20 of the film 16. Simultaneously therewith, the electron beam (not shown) in kinescope 47 is caused by means of deflection coils 49 energized from circuit 45 or other suitable source of conventional deflection signals to scan a raster 48 which is reflected by polished rod 50 to lens 46 which, in turn, images it on the inter-frame area 22 of film 16. It will, of course, be understood from the foregoing that the raster in kinescope 32 bears the green video signals and the gradually varying frequency side bands of the red and blue channels, while the beam in kinescope 47 is modulated by the waveform of Fig. 6 to produce, on the alternate film sections 22, gratings of frequency $F_1$ and $F_2$.

The record thus produced on film 16 by the apparatus of Fig. 5 is substantially the same as that resulting from the apparatus of Fig. 3 with the exception that the central frequencies applied to the red and blue modulators 36 and 40 are shifted, line by line, to compensate for the "frequency modulation" which results from the variable path lengths of the playback apparatus of Fig. 4. Therefore, the apparatus of Fig. 4, when used in conjunction with a film from the arrangement of Fig. 5, reproduces the green, red and blue video signals with no change from their original state as furnished by the simultaneous color camera 26.

While the invention has been described according to forms in which the carrier-recording kinescope 47 derives its deflection energy from the same source as that used for the image recording kinescope 32, it should be borne in mind that where interlacing of the image fields themselves is provided for, a separate deflection system for the carrier recording kinescope must be employed, since it is necessary that the carrier frequencies form a stationary and non-interlaced pattern on the kinescope 47. Where a separate deflection supply is employed, it may comprise either continuously running oscillators running at even multiples at half line frequency or oscillators keyed at the horizontal or line rate.

From the foregoing, it may be seen that the present invention is advantageous in that it provides means for recording color images on black and white film stock and in which the carriers are removed from the image area to eliminate beat patterns. Moreover, the mechanical changes required for existing installed monochrome flying spot film scanning equipment is relatively minor since it involves only the addition of the two polished rods to the optical assembly, together with the filters and amplitude detectors which select the various sets of color information. Additionally, since the playback equipment employs a single raster for reproducing both the video signals and the side band components, as well as the carrier waves, there is no problem of maintaining a plurality of flying spot scanners in phase.

Since the specific circuits denoted by the various blocks of the drawing are not a part of the invention, they may take any known form.

Having thus described my invention, what I claim as new and desire to secure by Letters Patent is:

1. Apparatus for recording, on monochrome film, electrical signals representative of a colored image which comprises: a source of a signal; a source of a carrier wave; means for modulating the amplitude of said carrier wave in accordance with said signal in such manner that said carrier is removed; means comprising a source of a flying spot of light for emitting light varying in accordance with the output of said modulator means; means for recording such light variations on film in a selected region thereof; and means for recording said carrier in a separate region of said film.

2. Apparatus for recording, on monochrome film, electrical signals representative of a colored image which comprises: a source of a signal; a source of a carrier wave; means for modulating the amplitude of said carrier wave in accordance with said signal in such manner that said carrier is suppressed; means comprising a source of a flying spot of light for emitting light varying in accordance with the output of said modulator means; means for recording such light variations on film in a selected region thereof, and means for recording said carrier in a separate region of said film.

3. Apparatus for recording, on monochrome film, electrical signals representative of a colored image which comprises: a source of a signal; a source of a carrier wave; means for modulating the amplitude of said carrier wave in accordance with said signal in such manner that said carrier is removed; means comprising a source of a flying spot of light for emitting light varying in accordance with the output of said modulator means; means for recording such light variations in discrete areas of such film; and means for recording said carrier in a region of such film between said discrete areas.

4. Apparatus for recording, on monochrome film, electrical signals representative of a colored image which comprises: a source of a signal; a source of a carrier wave; means for amplitude-modulating said carrier wave in accordance with said signal in such manner that said carrier is suppressed; means comprising a source of a flying spot of light for emitting light varying in accordance with the sidebands of said carrier; means for recording such light variations on film in a selected region thereof; and means for recording said carrier in a separate region of said film.

5. Apparatus for recording electrical signals representative of a colored image on monochrome film, which comprises: a source of a first signal; a source of a carrier wave whose frequency is greater than the highest frequency of said signal; a source of a second signal; means for modulating the amplitude of said carrier in accordance with said second signal in such manner that said carrier is suppressed; means for combining said first signal and the output of said modulator means to produce a composite signal; means comprising a source of a flying spot of light for emitting light modulated in intensity in accordance with such composite signal; means for emitting light varying in accordance with said carrier; and means for recording light variations from said first and second-named light-emitting means in separate areas of such film.

6. Apparatus as defined by claim 5 wherein light from said second-named light-emitting means is recorded in a region of said film between areas in which light from said first-named emitting means is recorded.

7. Apparatus for recording, on monochrome film, electrical signals representative of a colored image, which comprises: a source of a first color signal; a source of a second color signal; a source of a first carrier wave; a source of a second carrier wave whose frequency is substantially greater than said first carrier wave; means for amplitude-modulating a carrier wave from said first source with a signal from said first signal-source in such manner as to suppress said carrier; means for amplitude-modulating a carrier from said second source in accordance with a signal from said second signal source in such manner that said second carrier is suppressed; means for combining the outputs of said first and second modulator means to produce a composite electrical signal; means comprising a source of a flying spot of light for emitting light varying in accordance with such composite electrical signal; means for recording such light in an area of such film; and means for recording said first and second carrier waves in separate regions of said film other than said area.

8. Apparatus for recording, on monochrome film, electrical signals representative of a colored image, which comprises: a source of a first color signal; a source of a second color signal; a source of a first carrier wave; a source of a second carrier wave whose frequency is substantially greater than said first carrier wave; means for amplitude-modulating a carrier wave from said first source with a signal from said first signal-source in such manner as to suppress said carrier; means for amplitude-modulating a carrier from said second source in accordance with a signal from said second signal source in such manner that said second carrier is suppressed; means for combining the outputs of said first and second modulator means to produce a composite electrical signal; means comprising a source of a flying spot of light for emitting light varying in accordance with such composite electrical signal; additional light emitting means for recording light varying in accordance with said first carrier in a region of such film other than said area and for recording light varying in accordance with said second carrier in a region separate from said first region and said area.

9. Apparatus for recording, on monochrome film, electrical signals representative of a colored image, which comprises: a source of a first color signal; a source of a second color signal; a source of a first carrier wave; a source of a second carrier wave whose frequency is substantially greater than said first carrier wave; means for amplitude-modulating a carrier wave from said first source with a signal from said first signal-source in such manner as to suppress said carrier; means for amplitude-modulating a carrier from said second source in accordance with a signal from said second signal source in such manner that said second carrier is suppressed; means for combining the outputs of said first and second modulator means to produce a composite electrical signal; a second light-emitting means; means for causing light from said second light-emitting means to vary, for alternate periods, in accordance with said first and second carriers; and means for recording said alternate periods in regions of such film separate from each other and from said area.

10. Apparatus as defined by claim 9 wherein said carrier regions on such film are separated from each other by said area.

11. Apparatus for recording, on monochrome film, electrical signals representative of a colored image which comprises: a source of a signal; a source of a carrier wave; means for modulating the amplitude of said carrier wave in accordance with said signal in such manner that said carrier is removed; means comprising a cathode ray device for emitting light varying in accordance with the output of said modulator means; means for recording such light variations on film in a frame region thereof, and means comprising a second cathode ray device for recording said carrier in a separate strip-like region of said film adjacent said frame region.

12. Apparatus for recording, on monochrome film, electrical signals representative of a colored image which comprises: a source of a signal; a source of a carrier wave; means for modulating the amplitude of said carrier wave in accordance with said signal in such manner that said carrier is suppressed; means for emitting light varying in accordance with the output of said modulator means; means for recording such light variations on film in a selected region thereof; and means for developing bursts of energy of the same frequency as said carrier wave and adapted to occur at predetermined times; a cathode ray device adapted to emit light; means for projecting light from said device to such film; and means coupling said bursts to said cathode ray device such that said carrier is recorded on said film in a region separate from said first-named region.

13. Apparatus for recording, on monochrome film, electrical signals representative of a colored image which comprises: a source of a signal; a source of a carrier wave; means for modulating the amplitude of said carrier wave in accordance with said signal in such manner that said carrier is removed; means for emitting light varying in accordance with the output of said modulator means; means for recording such light variations in discrete areas of such film; and means including a cathode ray beam modulated by said carrier for recording said carrier in a region of such film between said discrete areas.

14. Apparatus for recording, on monochrome film, electrical signals representative of a colored image which comprises: a source of a signal; a source of a carrier wave; means for amplitude-modulating said carrier wave in accordance with said signal in such manner that said carrier is suppressed; means for emitting light varying in accordance with the sidebands of said carrier; means for recording such light variations on film in a selected region thereof; and means for recording said carrier in a separate region of said film, said last-named means including a kinescope having a control electrode, a source of bursts of carrier frequency energy and means coupling said burst source to said control electrode.

References Cited in the file of this patent

UNITED STATES PATENTS

| | | |
|---|---|---|
| 2,275,898 | Goldsmith | Mar. 10, 1942 |
| 2,525,891 | Garman | Oct. 17, 1950 |
| 2,531,031 | France | Nov. 21, 1950 |
| 2,594,715 | Angel | Apr. 29, 1952 |
| 2,600,868 | Hales | June 17, 1952 |
| 2,607,845 | Clark | Aug. 19, 1952 |